(12) United States Patent
Henschke et al.

(10) Patent No.: US 11,292,897 B2
(45) Date of Patent: Apr. 5, 2022

(54) THERMOPLASTIC POLYOLEFIN BLENDS INCLUDING BLOCK COMPOSITES AS COMPATIBILIZERS

(71) Applicant: Dow Global Technologies LLC, Midland, MI (US)

(72) Inventors: Olaf Henschke, Huenenberg See (CH); Yahong Zhang, Shanghai (CN); Wei Li, Shanghai (CN); Hang Wu, Shanghai (CN); Takahiko Ohmura, Fujisawa (JP); Yushan Hu, Pearland, TX (US); Ming Ming, Shanghai (CN); Krischan Jeltsch, Zurich (CH)

(73) Assignee: Dow Global Technologies LLC, Midland, MI (US)

( * ) Notice: Subject to any disclaimer, the term of this patent is extended or adjusted under 35 U.S.C. 154(b) by 80 days.

(21) Appl. No.: 16/306,130

(22) PCT Filed: May 24, 2017

(86) PCT No.: PCT/US2017/034310
§ 371 (c)(1),
(2) Date: Nov. 30, 2018

(87) PCT Pub. No.: WO2017/210064
PCT Pub. Date: Dec. 7, 2017

(65) Prior Publication Data
US 2020/0332101 A1 Oct. 22, 2020

(30) Foreign Application Priority Data
May 31, 2016 (WO) ................ PCT/CN2016/084004

(51) Int. Cl.
C08L 23/08 (2006.01)
C08L 23/12 (2006.01)
C08F 10/06 (2006.01)

(52) U.S. Cl.
CPC .......... *C08L 23/0815* (2013.01); *C08F 10/06* (2013.01); *C08L 23/12* (2013.01); *C08L 2205/035* (2013.01); *C08L 2207/00* (2013.01); *C08L 2207/02* (2013.01)

(58) Field of Classification Search
CPC ............................................. C08L 2205/035
See application file for complete search history.

(56) References Cited

U.S. PATENT DOCUMENTS

| 6,825,280 | B1 | 11/2004 | Hayakawa et al. |
| 7,863,379 | B2 | 1/2011 | Kapur et al. |
| 8,372,931 | B2 | 2/2013 | Hermel-Davidock et al. |
| 8,563,658 | B2 | 10/2013 | Walton et al. |
| 8,716,400 | B2 | 5/2014 | Carnahan et al. |
| 8,785,554 | B2 | 7/2014 | Li Pi Shan et al. |
| 8,802,774 | B2 | 8/2014 | Carnahan et al. |
| 8,822,598 | B2 | 9/2014 | Li Pi Shan et al. |
| 8,822,599 | B2 | 9/2014 | Li Pi Shan et al. |
| 8,921,491 | B2 | 12/2014 | Walton et al. |
| 9,359,498 | B2 | 6/2016 | Mikami et al. |
| 10,208,193 | B2 | 2/2019 | Jin et al. |
| 2010/0113698 | A1 | 5/2010 | Walton et al. |
| 2011/0082258 | A1* | 4/2011 | Walton ................ C08L 53/00 525/89 |
| 2012/0208946 | A1 | 8/2012 | Shan et al. |
| 2014/0323656 | A1 | 10/2014 | Hu et al. |
| 2014/0378601 | A1 | 12/2014 | Jin et al. |
| 2015/0191590 | A1 | 7/2015 | Mikami et al. |

FOREIGN PATENT DOCUMENTS

| JP | 1108049 | 3/1999 |
| JP | 200021238 A | 1/2000 |
| WO | 1998027154 | 6/1998 |
| WO | 2004035681 A2 | 4/2004 |
| WO | 2006070179 A1 | 7/2006 |
| WO | 2008009432 A1 | 1/2008 |
| WO | 2011/041696 A1 | 4/2011 |
| WO | 2015/057423 A1 | 4/2015 |
| WO | WO 2016/182817 A1 * | 11/2016 |

OTHER PUBLICATIONS

PCT/US2017/034310, International Search Report and Written Opinion dated Jul. 31, 2017.
PCT/US2017/034310, International Preliminary Report on Patentability dated Dec. 13, 2018.
PCT/CN2016/084004, International Search Report and Written Opinion dated Oct. 31, 2016.
PCT/CN2016/084004, International Preliminary Report on Patentability dated Dec. 13, 2018.

* cited by examiner

*Primary Examiner* — Marc S Zimmer

(57) ABSTRACT

A composition comprising (A) from 10 wt % to 90 wt % of a propylene component including at least one propylene based polymer having a propylene content of at least 50.0 wt %, based on the total weight of the propylene based polymer, and a melt flow rate from 0.5 g/10 min to 200.0 g/10 min (ASTM D-1238 at 230° C., 2.16 kg); (B) from 1 wt % to 60 wt % of a polyolefin elastomer; (C) from 1 wt % to 20 wt % of a block composite comprising (i) an ethylene-propylene copolymer, (ii) an isotactic polypropylene copolymer, and (iii) a block copolymer including an ethylene-propylene soft block that has a same composition as the ethylene-propylene copolymer of the block composite and an isotactic polypropylene hard block that has a same composition as the isotactic polypropylene copolymer of the block composite; and (D) optionally, from 0.1 wt % to 10 wt % of an antioxidant.

10 Claims, 4 Drawing Sheets

Comparative Example B

Working Example 2

Comparative Example D

Working Example 5

Working Example 6

THERMOPLASTIC POLYOLEFIN BLENDS INCLUDING BLOCK COMPOSITES AS COMPATIBILIZERS

FIELD

Embodiments relate to thermoplastic polyolefin blends that include a block composite (BC) compatibilizer.

INTRODUCTION

Soft thermoplastic polyolefin (TPO) formulations are widely used in automotive applications, such as airbag covers. Polymer blends are highly competitive for soft TPO applications in terms of both cost and performance. Such blends include, for example, polypropylene (PP) homopolymers or copolymers blended with polyolefin elastomers. However, a need still exists for low cost solutions (e.g., by reducing the elastomer content) where the impact performance of soft TPO formulations is improved at low temperatures, while maintaining high melt flow rate for easy processing, practical flexural modulus, and excellent temperature resistance.

SUMMARY

Embodiments may be realized by providing a composition comprising:
(A) from 10 wt % to 90 wt % of a propylene component including at least one propylene based polymer having a propylene content of at least 50.0 wt %, based on the total weight of the propylene based polymer, and a melt flow rate from 0.5 g/10 min to 200.0 g/10 min (ASTM D-1238 or ISO 1133 at 230° C., 2.16 kg);
(B) from 1 wt % to 60 wt % of a polyolefin elastomer; and
(C) from 1 wt % to 20 wt % of a block composite comprising (i) an ethylene-propylene copolymer, (ii) an isotactic polypropylene copolymer, and (iii) a block copolymer including an ethylene-propylene soft block that has a same composition as the ethylene-propylene copolymer of the block composite and an isotactic polypropylene hard block that has a same composition as the isotactic polypropylene copolymer of the block composite.

In further embodiments, the composition may optionally include from 0.1 wt % to 10 wt % of an antioxidant.

DETAILED DESCRIPTION

Figure 1:
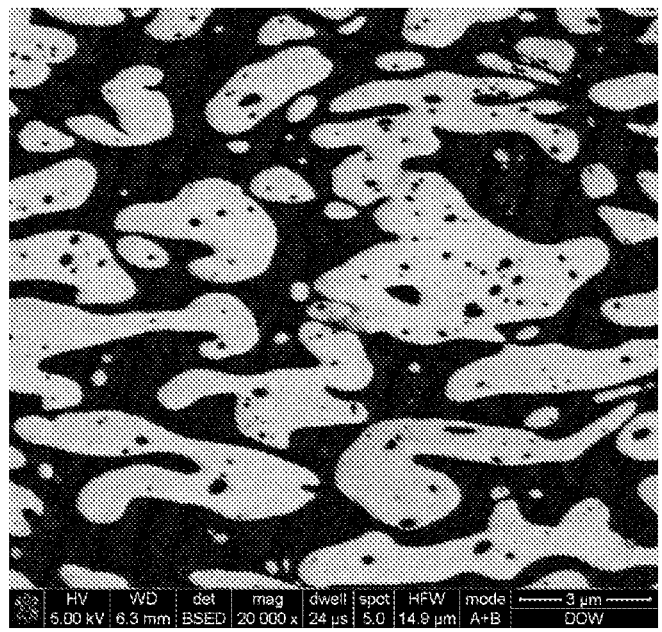
FIG. 1 illustrates the scanning electron microscope (SEM) morphology characterization, at 3 μm, for a PP phase (bright phase) dispersed in a polyolefin elastomer (color phase) matrix for Comparative Example B and Working Example 2.
Figure 1:
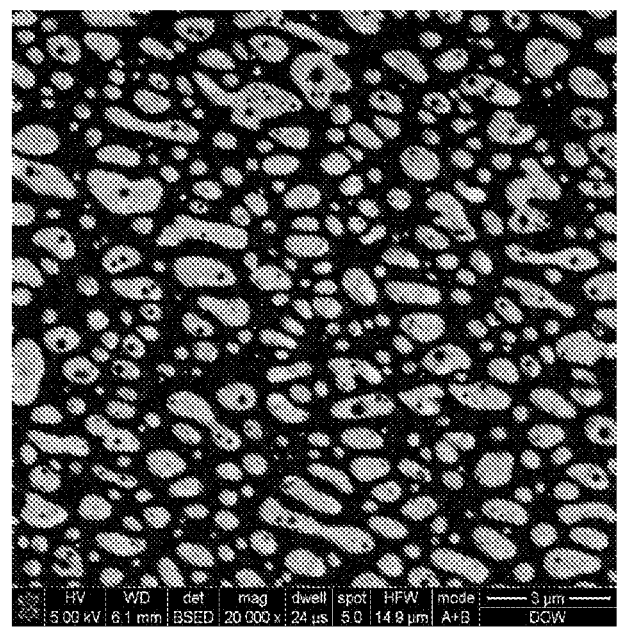

Embodiments relate to a composition that includes a propylene based polymer, a polyolefin elastomer, and a block composite (BC) compatibilizer.
Terms The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As used with respect to a chemical compound, unless specifically indicated otherwise, the singular includes all isomeric forms and vice versa.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

"Composition" and like terms mean a mixture or blend of two or more components. "Blend," "polymer blend," and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a compound prepared by polymerizing monomers, whether of the same or a different type. The generic term polymer embraces the term homopolymer, usually employed to refer to polymers prepared from only one type of monomer, and the term interpolymer and copolymer as defined below. It also encompasses all forms of interpolymers, e.g., random, block, homogeneous, heterogeneous, etc.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Units derived from ethylene," "ethylene content," and like terms mean the units of a polymer that formed from the polymerization of ethylene monomers. "Units derived from α-olefin," "alpha-olefin content," "α-olefin content," and like terms mean the units of a polymer that formed from the polymerization of specific α-olefin monomers, in particular at least one of a $C_{3-10}$ α-olefin. "Units derived from propylene," "propylene content," and like terms mean the units of a polymer that formed from the polymerization of propylene monomers.

"Propylene based polymer," and like terms mean a polymer that comprises a majority weight percent polymerized propylene monomer, also referred to as units derived from propylene (based on the total amount of polymerizable monomers), and optionally comprises at least one polymerized comonomer different from propylene (such as at least one selected from a $C_2$ and $C_{4-10}$ α olefin) so as to form a propylene-based interpolymer. For example, when the propylene-based polymer is a copolymer, the propylene content is greater than 50 wt %, based on the total weight of the copolymer.

"Ethylene based polymer" and like terms mean a polymer that comprises a majority weight percent polymerized ethylene monomer, also referred to as units derived from ethylene (based on the total weight of polymerizable monomers), and optionally may comprise at least one polymerized comonomer different from ethylene (such as at least one selected from a $C_{3-10}$ α olefin) so as to form an ethylene-based interpolymer. For example, when the ethylene-based polymer is a copolymer, the amount of ethylene is greater than 50 wt %, based on the total weight to the copolymer.

The term "polyethylene" includes homopolymers of ethylene and copolymers of ethylene and one or more $C_{3-8}$ α-olefins in which ethylene comprises at least 50 mole percent. The term "polypropylene" includes homopolymers of propylene such as isotactic polypropylene, syndiotactic polypropylene, and copolymers of propylene and one or more $C_{2, 4-8}$ α-olefins in which propylene comprises at least 50 mole percent. Preferably, a plurality of the polymerized monomer units of at least one block or segment in the polymer (a crystalline block) comprise propylene, preferably at least 90 mole percent, more preferably at least 93 mole percent, and most preferably at least 95 mole percent. A polymer made primarily from a different α-olefin, such as 4-methyl-1-pentene would be named similarly.

The term "crystalline" refers to a polymer or polymer block that possesses a first order transition or crystalline melting point (Tm) as determined by differential scanning calorimetry (DSC) or equivalent technique. The term may be used interchangeably with the term "semicrystalline".

The term "crystallizable" refers to a monomer that can polymerize such that the resulting polymer is crystalline. Crystalline ethylene polymers typically have, but are not limited to, densities of 0.89 g/cc to 0.97 g/cc and melting points of 75° C. to 140° C. Crystalline propylene polymers may have, but are not limited to, densities of 0.88 g/cc to 0.91 g/cc and melting points of 100° C. to 170° C.

The term "amorphous" refers to a polymer lacking a crystalline melting point as determined by differential scanning calorimetry (DSC) or equivalent technique.

The term "isotactic" is defined as polymer repeat units having at least 70 percent isotactic pentads as determined by $^{13}$C-NMR analysis. "Highly isotactic" is defined as polymers having at least 90 percent isotactic pentads.

The term "block copolymer" or "segmented copolymer" refers to a polymer comprising two or more chemically distinct regions or segments (referred to as "blocks") joined in a linear manner, that is, a polymer comprising chemically differentiated units that are joined (covalently bonded) end-to-end with respect to polymerized functionality (e.g., polymerized propylenic functionality), rather than in pendent or grafted fashion. Block copolymers comprise sequences ("blocks") of the same monomer unit, covalently bound to sequences of unlike type. The blocks can be connected in a variety of ways, such as A-B in diblock and A-B-A triblock structures, where A represents one block and B represents a different block. In a multi-block copolymer, A and B can be connected in a number of different ways and be repeated multiply. It may further comprise additional blocks of different type. Multi-block copolymers may be linear multi-block, multi-block star polymers (in which all blocks bond to the same atom or chemical moiety) or comb-like polymers where the B blocks are attached at one end to an A backbone. The block copolymers can be linear or branched. With respect to the block copolymers, the blocks may differ in the amount of comonomer incorporated therein. The blocks may also differ in the type of comonomer, density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers are characterized by unique distributions of polymer polydispersity (PDI or Mw/Mn), block length distribution, and/or block number distribution, e.g., due to the effect of the shuttling agent(s) in combination with the catalyst(s).

The term "block composite" (BC) refers to polymers comprising a soft copolymer, a hard copolymer, and a block copolymer having a soft block (i.e., soft segment) and a hard block (i.e., hard segment), wherein the hard block of the block copolymer is the same composition as the hard copolymer of the block composite and the soft block of the block copolymer is the same composition as the soft copolymer of the block composite. The compositional split between the amount of soft copolymer and hard copolymer will be essentially the same as that between the corresponding blocks in the block copolymer. The block copolymers can be linear or branched.

"Hard" blocks/segments refer to highly crystalline blocks of polymerized units in which a monomer (e.g., propylene) is present in an amount greater than 90 mole percent. In other words, the comonomer content (e.g., ethylene content) in the hard blocks/segments is less than 10 mole percent. In some embodiments, the hard segments comprise all or substantially all propylene units (such as an iPP-isotactic polypropylene-copolymer or homopolymer block). "Soft" blocks/segments, on the other hand, refer to amorphous, substantially amorphous, or elastomeric blocks of polymerized units in which a monomer (e.g., ethylene) is present in an amount from 10 mole percent to 90 mole percent.

Block Composite Compatibilizer

The composition includes a block composite as a compatibilizer. The amount of the block composite in the composition is from 1 wt % to 20 wt % (e.g., from 2 wt % to 20% and from 3 wt % to 15 wt %) based on the total weight of the composition. In exemplary embodiments, the block composite may have a total ethylene content that is from 25 wt % to 70 wt % (e.g., from 25 wt % to 60 wt %, from 25 wt % to 55 wt %, and from 30 wt % to 50 wt %) based on the total weight of the block composite. The remainder of the total weight of the block composite may be accounted for by units derived from at least one $C_{3-10}$ alpha-olefin. For example, the remainder of the total weight of the block composite may be accounted for by units derived from propylene.

In exemplary embodiments, the block composite refers to polymers comprising a soft copolymer having an ethylene content that is from 10 mol % to 90 mol %, a hard copolymer having a propylene content that is greater than 90 mol %, and a block copolymer (e.g., a diblock) having a soft block (i.e., soft segment) and a hard block (i.e., hard segment), wherein the hard block of the block copolymer is the same composition as the hard copolymer of the block composite and the soft block of the block copolymer is the same composition as the soft copolymer of the block composite. The compositional split between the amount of soft copolymer and hard copolymer will be essentially the same as that between the corresponding blocks in the block copolymer.

In certain embodiments, the block composite refers to polymers comprising a soft copolymer having an ethylene content that is greater than 10 wt % and less than 95 wt %, a hard copolymer having a propylene content that is greater than 80 wt % and up to 100 wt %, and a block copolymer (e.g., a diblock) having a soft block (i.e., soft segment) and a hard block (i.e., hard segment), wherein the hard block of the block copolymer is the same composition as the hard copolymer of the block composite and the soft block of the block copolymer is the same composition as the soft copolymer of the block composite. The compositional split between the amount of soft copolymer and hard copolymer will be essentially the same as that between the corresponding blocks in the block copolymer.

In exemplary embodiments, the hard blocks refer to highly crystalline blocks of polymerized alpha-olefin units (e.g., propylene). In the hard blocks, the monomer (i.e., propylene) may be present in an amount greater than 80 wt % (e.g., greater than 85 wt %, greater than 90 wt %, and/or greater than 95 wt %). The remainder of the hard block may be the comonomer (e.g., ethylene) in an amount of less than 20 wt % (e.g., less than 15 wt % and/or less than 10 wt %). In exemplary embodiments, the hard blocks comprise all or substantially all propylene units, such as an iPP (isotactic) homopolymer block or an iPP copolymer block with less than 10 wt % of ethylene. In exemplary embodiments, the soft blocks refer to amorphous, substantially amorphous, or elastomer blocks of polymerized ethylene units. In the soft blocks, the monomer (i.e., ethylene) may be present in an amount of greater than 20 wt % and equal to or less than 100 wt % (e.g., from 40 wt % to 99 wt %, from 45 wt % to 90 wt %, and/or from 50 wt % to 80 wt %). The remainder of the soft block may be the comonomer (e.g., propylene).

According to an exemplary embodiment, the block composite includes a block copolymer having 30-70 wt % hard block and 30-70 wt % soft block. In other words, the block composite includes a block copolymer having 30-70 wt % hard block and 30-70 wt % soft block based on the weight of the block copolymer.

According to an exemplary embodiment, the block copolymer of the block composite has the formula (EP)-(iPP), in which EP represents the soft block of polymerized ethylene and propylene monomeric units (e.g., 50-80 wt % of ethylene and remainder propylene) and iPP represents a hard block of isotactic propylene homopolymer or isotactic propylene copolymer (e.g., less than 10 wt % of ethylene and remainder propylene).

The block composites may include from 0.5 wt % to 95.0 wt % EP, from 0.5 to 95.0 wt % iPP, and from 5.0 wt % to 99.0 wt % of the block copolymer. Weight percents are based on total weight of block composite. The sum of the weight percents of EP, iPP, and the block copolymer equals 100%. An exemplary measurement of the relative amount of the block copolymer is referred to as the Block Composite Index (BCI), as further discussed below. The BCI for the block composite is greater than 0 and less than 1.0.

In some embodiments, the block composites may have a microstructure index greater than 1 and equal to or less than 20. The microstructure index is an estimation using solvent gradient interaction chromatography (SGIC) separation to differentiate between block copolymers from random copolymers. In particular, microstructure index estimation relies on differentiating between two fractions, i.e., a higher random copolymer content fraction and a higher block copolymer content fraction, of which the random copolymer and the block copolymer have essentially the same chemical composition. The early eluting fraction (i.e., the first fraction) correlates to random copolymers and the late eluting component (i.e., the second fraction) correlates to block copolymers. The calculation of the microstructure index is discussed below.

The block composites may have a weight average molecular weight (Mw) from 10,000 g/mol to 2,500,00 g/mol, from 35,000 g/mol to 1,000,000 g/mol, from 50,000 g/mol to 300,000 g/mol, and/or from 50,000 g/mol to 200,000 g/mol. For example, the Mw may be from 20 kg/mol to 1,000 kg/mol, from 50 kg/mol to 500 kg/mol, and/or from 80 kg/mol to 200 kg/mol. The molecular weight distribution (Mw/Mn) or polydispersity of the block composites may be less than 5, between 1 and 5, and/or between 1.5 and 4. Weight average molecular weight (Mw) and number average molecular weight (Mn) are well known in polymer art and can be determined by methods known to a person of ordinary skill in the art.

The melt flow rate (MFR) of the block composites may be from 0.1 g/10 min to 1,000 g/10 min measured in accordance with ASTM D-1238 or ISO 1133 (230° C.; 2.16 kg). For example, the melt flow rate of the block composites may be from 3 g/10 min to 60 g/10 min (e.g., from 3 g/10 min to 20 g/10 min, from 3 g/10 min to 15 g/10 min, and from 3 g/10 min to 10 g/10 min).

The density of the block composites may be between 0.850 and 0.920 g/cc. In exemplary embodiments, the density of the block composites is from 0.860 to 0.895, from 0.865 to 0.895, and/or from 0.865 to 0.890 g/cc. Density is measured in accordance with ASTM D792.

The block composites may have a second peak Tm of greater than 90° C. (e.g., greater than 100° C.). According to an exemplary embodiment, the block composites exhibit a second peak Tm in a range from 100° C. to 150° C.

The block composites may be differentiated from conventional, random copolymers, physical blends of polymers, and block copolymers prepared via sequential monomer addition. The block composites may be differentiated from random copolymers by characteristics such as higher melting temperatures for a comparable amount of comonomer, BCI, and microstructure index; from a physical blend by characteristics such as BCI, microstructure index, better tensile strength, improved fracture strength, finer morphology, improved optics, and/or greater impact strength at lower temperature; and from block copolymers prepared by sequential monomer addition by molecular weight distribution, rheology, shear thinning, rheology ratio, and in that there is block polydispersity. For example, the block composite include a block copolymer having distinct regions or segments (referred to as "blocks") joined in a linear manner. The blocks differ, e.g., in the type of crystallinity such as polyethylene (PE) versus polypropylene (PP). The block copolymers can be linear or branched. When produced in a continuous process, the block composites may possess PDI from 1.7 to 15 (e.g., from 1.8 to 10, from 1.8 to 5, and/or from 1.8 to 3.5). When produced in a batch or semi-batch process, the block composites may possess PDI from 1.0 to 2.9 (e.g., from 1.3 to 2.5, from 1.4 to 2.0, and/or from 1.4 to 1.8). Exemplary block composites are described in, e.g., U.S. Patent Application Publication No. 2014/0174509, incorporated herein by reference with respect to, for example, processes to make them and methods of analyzing them.

The block composite includes the block copolymers possessing a most probable distribution of block lengths. The block copolymers may contain 2 or 3 blocks or segments. In a process for making the polymers of the block composite, chain shuttling is used as a way to prolong the lifetime of a polymer chain such that a substantial fraction of the polymer chains exit at least the first reactor of a multiple reactor series or the first reactor zone in a multiple zoned reactor operating substantially under plug flow conditions in the form of polymer terminated with a chain shuttling agent, and the polymer chain experiences different polymerization conditions in the next reactor or polymerization zone. Different polymerization conditions in the respective reactors or zones include the use of different monomers, comonomers, or monomer/comonomer(s) ratio, different polymerization temperatures, pressures or partial pressures of various monomers, different catalysts, differing monomer gradients, or any other difference leading to formation of a distinguishable polymer segment. Thus, at least a portion of the polymer comprises two, three, or more, preferably two or three, differentiated polymer segments arranged intramolecularly.

The block composite polymers are prepared, e.g., by a process comprising contacting an addition polymerizable monomer or mixture of monomers under addition polymerization conditions with a composition comprising at least one addition polymerization catalyst, a cocatalyst, and a chain shuttling agent. The process is characterized by formation of at least some of the growing polymer chains under differentiated process conditions in two or more reactors operating under steady state polymerization conditions or in two or more zones of a reactor operating under plug flow polymerization conditions.

Suitable processes useful in producing the block composites may be found in, e.g. example, U.S. Pat. Nos. 8,053,529, 8,686,087, and 8,716,400. The polymerization may be carried out as a continuous polymerization, e.g., a continuous-solution polymerization, in which catalyst components, monomers, and optionally solvent, adjuvants, scavengers, and/or polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. Further, a chain shuttling agent(s) may be added at any point during the polymerization including in a first reactor or zone, at the exit or slightly before the exit of the first reactor, between the first reactor or zone and a second or any subsequent reactor or zone, or even solely to the second or any subsequent reactor or zone. Exemplary chain shuttling agents, catalysts, and cocatalysts are those disclosed in, e.g., U.S. Pat. No. 7,951,882. For example, chain shuttling agents that are dialkyl zinc compounds may be used.

The catalyst may be prepared as a homogeneous composition by addition of the requisite metal complex or multiple complexes to a solvent in which the polymerization will be conducted or in a diluent compatible with the ultimate reaction mixture. The desired cocatalyst or activator and, optionally, the shuttling agent may be combined with the catalyst composition either prior to, simultaneously with, or after combination of the catalyst with the monomers to be polymerized and any additional reaction diluent.

Due to the difference in monomers, temperatures, pressures, or other differences in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes. Each reactor in the series can be operated under high pressure, solution, slurry, or gas phase polymerization conditions.

In the following exemplary processes, continuous or substantially continuous polymerization conditions may be employed. In a multiple zone polymerization, all zones operate under the same type of polymerization, such as solution, slurry, or gas phase, but at different process conditions. For a solution polymerization process, it is desirable to employ homogeneous dispersions of the catalyst components in a liquid diluent in which the polymer is soluble under the polymerization conditions employed. A high pressure process may be carried out at temperatures from 100° C. to 400° C. and at pressures above 500 bar (50 MPa). A slurry process may use an inert hydrocarbon diluent and temperatures of from 0° C. up to a temperature just below the temperature at which the resulting polymer becomes substantially soluble in the inert polymerization medium. Exemplary temperatures in a slurry polymerization are from 30° C. and pressures may range from atmospheric (100 kPa) to 500 psi (3.4 MPa).

Without limiting in any way the scope of the embodiments, one means for carrying out such a polymerization process is as follows. In one or more well stirred tank or loop reactors operating under solution polymerization conditions, the monomers to be polymerized are introduced continuously together with any solvent or diluent at one part of the reactor. The reactor contains a relatively homogeneous liquid phase composed substantially of monomers together with any solvent or diluent and dissolved polymer. Exemplary solvents include $C_{4-10}$ hydrocarbons or mixtures thereof, especially alkanes such as hexane or mixtures of alkanes, as well as one or more of the monomers employed in the polymerization. Catalyst along with cocatalyst and optionally chain shuttling agent are continuously or intermittently introduced in the reactor liquid phase or any recycled portion thereof at a minimum of one location.

The reactor temperature and pressure may be controlled by adjusting the solvent/monomer ratio, the catalyst addition rate, as well as by use of cooling or heating coils, jackets or both. The polymerization rate is controlled by the rate of catalyst addition. The content of a given monomer in the polymer product is influenced by the ratio of monomers in the reactor, which is controlled by manipulating the respective feed rates of these components to the reactor. The polymer product molecular weight is controlled, optionally, by controlling other polymerization variables such as the temperature, monomer concentration, or by the previously mentioned chain shuttling agent, or a chain terminating agent such as hydrogen. Connected to the discharge of the reactor, optionally by means of a conduit or other transfer means, is a second reactor, such that the reaction mixture prepared in the first reactor is discharged to the second reactor without substantially termination of polymer growth. Between the first and second reactors, a differential in at least one process condition is established. For example, use in formation of a copolymer of two or more monomers, the difference is the presence or absence of one or more comonomers or a difference in comonomer concentration. Additional reactors, each arranged in a manner similar to the second reactor in the series may be provided as well. Upon exiting the last reactor of the series, the effluent is contacted with a catalyst kill agent such as water, steam or an alcohol or with a coupling agent. The resulting polymer product is recovered by flashing off volatile components of the reaction mixture such as residual monomers or diluent at reduced pressure, and, if necessary, conducting further devolatilization in equipment such as a devolatilizing extruder.

Alternatively, the foregoing polymerization may be carried out in a plug flow reactor with a monomer, catalyst, shuttling agent, temperature or other gradient established between differing zones or regions thereof, optionally accompanied by separated addition of catalysts and/or chain shuttling agent, and operating under adiabatic or non-adiabatic polymerization conditions.

Propylene Component

The composition includes from 10 wt % to 90 wt % (e.g., from 15 wt % to 80 wt %, from 30 wt % to 75 wt %, from 40 wt % to 70 wt %, etc.) of a propylene component. The propylene component includes one or more propylene based polymers having a propylene content of at least 50.0 wt %, based on the total weight of the propylene based polymer. The one or more propylene based polymer has a melt flow rate from 0.1 g/10 min to 500.0 g/10 min, according to ASTM D-1238 or ISO 1133 at 230° C., 2.16 kg (e.g., from 1 g/10 min to 100.00 g/10 min and from 1 g/10 min to 80.0 g/10 min). The propylene based polymer may have a density, in accordance with ASTM D792-00, Method 13, from 0.850 g/cc to 0.950 g/cc (e.g., from 0.860 g/cc to 0.930 g/cc, from 0.865 to 0.920 g/cc, from 0.870 to 0.910 g/cc, etc.). The propylene based polymer may consist of heterogeneous polypropylene or homogeneous polypropylene.

Each of the one of more propylene based polymers may be a propylene homopolymer, propylene based interpolymers, a random copolymer polypropylene (RCPP), an impact copolymer polypropylene (e.g., homopolymer propylene modified with at least one elastomeric impact modifier) (ICPP), a high impact polypropylene (HIPP), a high melt strength polypropylene (HMS-PP), an isotactic polypropylene (iPP), a syndiotactic polypropylene (sPP), or a combination thereof. In exemplary embodiments, the one or more propylene based polymers may be in the isotactic form of homopolymer polypropylene, although other forms of polypropylene may be used (e.g., syndiotactic or atactic). In exemplary embodiments, the one or more propylene based polymers may be a polypropylene homopolymer or an impact copolymer polypropylene.

The one or more propylene-based polymers are formed without the use of a chain shuttling agent, as discussed below with respect to the block composites. Exemplary comonomers for polymerizing with propylene include ethylene, 1-butene, 1 pentene, 1-hexene, 1-heptene, 1-octene, 1-nonene, 1-decene, 1-unidecene, 1 dodecene, as well as 4-methyl-1-pentene, 4-methyl-1-hexene, 5-methyl-1-hexene, vinylcyclohexane, and styrene. Exemplary comonomers include ethylene, 1-butene, 1-hexene, and 1-octene. Exemplary propylene based interpolymers include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene. Optionally, the propylene-based polymer include a monomer having at least two double bonds such as dienes or trienes. Other unsaturated comonomers include, e.g., 1,3-pentadiene, norbornadiene, and dicyclopentadiene; C8-40 vinyl aromatic compounds including styrene, o-, m-, and p-methylstyrene, divinylbenzene, vinylbiphenyl, vinylnaphthalene; and halogen-substituted C8-40 vinyl aromatic compounds such as chlorostyrene and fluorostyrene.

Exemplary propylene-based polymers are formed by means within the skill in the art, for example, using single site catalysts (metallocene or constrained geometry) or Ziegler natta catalysts.

An exemplary discussion of various polypropylene polymers is contained in Modern Plastics Encyclopedia/89, mid October 1988 Issue, Volume 65, Number 11, pp. 86-92, the entire disclosure of which is incorporated herein by reference. Examples of such propylene based polymers include VERSIFY™ (available from The Dow Chemical Company), Vistamaxx™ (available from Exxon Mobil), INSPIRE™ (available from Braskem), and Pro-Fax (available from LyondellBasell).

In exemplary embodiments, the propylene-based polymer may be a propylene-alpha-olefin copolymer, which is characterized as having substantially isotactic propylene sequences. "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93.

Similarly as discussed with respect to the ethylene-based polymers, the propylene-based polymers may contain LCB. For example, the propylene-based polymer may contain an average of at least 0.001, an average of at least 0.005 and/or an average of at least 0.01, long chain branches/1000 total carbons. The term long chain branch, as used herein, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length.

Further parameters of the propylene based polymers (e.g., molecular weight, molecular weight distribution, melting temperature, etc.) will be known by those of ordinary skill in the art based on the present disclosures and can be determined by methods known in the polymer art.

Polyolefin Elastomer

The composition may include from 1 to 60 wt % (e.g., from 20 wt % to 60 wt %, from 25 wt % to 60 wt %, from 25 wt % to 55 wt %, etc.) of a polyolefin elastomer. In certain embodiments of the present disclosure, the polyolefin elastomer may be used to toughen the propylene component of the composition. Suitable polyolefin elastomers may be any elastomer with sufficient polypropylene compatibility and sufficiently low enough glass transition temperature to impart impact toughness to the propylene component. In one embodiment, the polyolefin elastomer is a randomly copolymerized ethylene/alpha-olefin copolymer. In a further embodiment, the polyolefin elastomer is an ethylene/alpha-olefin interpolymer. In a further embodiment, the polyolefin elastomer is an ethylene/alpha-olefin multiblock interpolymer. In further embodiments, the polyolefin elastomer may be ethylene propylene rubber (EPR), ethylene propylene diene monomer (EPDM), ethylene-vinyl acetate (EVA), ethylene butyl acrylate (EBA), styrenic block copolymers, or mixtures thereof.

The ethylene/α-olefin random copolymers used as the toughening elastomer in the embodiments of the invention are preferably copolymers of ethylene with at least one $C_3$-$C_{20}$ α-olefin. Copolymers of ethylene and a $C_3$-$C_{20}$ α-olefin are especially preferred. Non-limiting examples of such copolymers are linear, homogeneously branched copolymers such as EXACT® from ExxonMobil and TAFMER® from Mitsui, and substantially linear, homogeneously branched copolymers such as AFFINITY® and ENGAGE® copolymers from the Dow Chemical Company.

The copolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin copolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable elastomers that can be made in accordance with embodiments of the invention are elastomers of ethylene, a $C_3$-$C_{20}$ α-olefin, especially propylene, and optionally one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene containing polymers are generally referred to in the art as EP or EPDM polymers. Suitable dienes for use in preparing such polymers, especially EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

In certain embodiments, ethylene/α-olefin block interpolymers may be used as the toughening elastomer. The ethylene/α-olefin interpolymer comprises polymerized units of ethylene and α-olefin, wherein the interpolymer is characterized by an average block index greater than zero and up to about 1.0 and a molecular weight distribution, $M_w/M_n$, greater than about 1.3. In another aspect, the invention relates to an ethylene/α-olefin interpolymer comprising polymerized units of ethylene and α-olefin, wherein the average block index is greater than 0 but less than about 0.5 and a molecular weight distribution, $M_w/M_n$, greater than about 1.3. Preferably, the interpolymer is a linear, multi-block copolymer with at least three blocks. Also preferably, the ethylene content in the interpolymer is at least 50 mole percent. These are described in and may be produced via polymerization techniques as illustrated in, for example, U.S. Pat. No. 7,608,668 B2, which is herein incorporated by reference. Another type of ethylene/α-olefin block interpolymers that may be used are those referred to as "mesophase separated". These mesodomains can take the form of spheres, cylinders, lamellae, or other morphologies known for block copolymers. The narrowest dimension of a domain, such as perpendicular to the plane of lamellae, is generally greater than about 40 nm in the mesophase separated block copolymers of the instant invention. Examples of these interpolymers may be found in, for example, International Publication Nos. WO/2009/097560, WO/2009/097565, WO/2009/097525, WO/2009/097529, WO/2009/097532, and WO/2009/097535, all of which are herein incorporated by reference.

In certain embodiments, selectively hydrogenated block copolymers can be used as the toughening elastomer including block copolymers of conjugated dienes and vinyl aromatic hydrocarbons which exhibit elastomeric properties and which have 1,2-microstructure contents prior to hydrogenation of from about 7% to about 100%. Such block copolymers may be multiblock copolymers of varying structures containing various ratios of conjugated dienes to vinyl aromatic hydrocarbons including those containing up to about 60 percent by weight of vinyl aromatic hydrocarbon. Thus, multiblock copolymers may be utilized which are linear or radial, symmetric, or asymmetric and which have structures represented by the formulae, A-B, A-B-A, A-B-A-B, B-A, B-A-B, B-A-B-A, $(AB)_{0, 1, 2}$ . . . BA and the like wherein A is a polymer block of a vinyl aromatic hydrocarbon or a conjugated diene/vinyl aromatic hydrocarbon tapered copolymer block and B is a polymer block of a conjugated diene.

The block styrenic copolymers may be produced by any well known ionic block polymerization or copolymerization procedures including the well known sequential addition of monomer techniques, incremental addition of monomer techniques or coupling techniques as illustrated in, for example, U.S. Pat. Nos. 3,251,905, 3,390,207, 3,598,887, and 4,219,627, all of which are incorporated herein by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,905, 3,265,765, 3,639,521, and 4,208,356, the disclosures of which are incorporated herein by reference.

In certain embodiments, the polyolefin elastomer of the present disclosure has a density of from 0.850 g/cc to 0.920 g/cc (e.g., from 0.850 g/cc to 0.900 g/cc, from 0.850 g/cc to 0.890 g/cc, from 0.850 g/cc to 0.880 g/cc, etc). In certain embodiments, the polyolefin elastomer of the present disclosure has a melt index of from 0.1 g/10 min to 2000 g/10 min, according to ASTM D1238 or ISO 1133 at 190° C./2.16 kg (e.g., from 0.1 g/10 min to 500 g/10 min, from 0.1 g/10 min to 100 g/10 min, from 0.1 g/10 min to 50 g/10 min, etc.).

Further parameters of the polyolefin elastomers (e.g., molecular weight, molecular weight distribution, melting temperature, etc.) will be known by those of ordinary skill in the art based on the present disclosures and can be determined by methods known in the polymer art.

Composition

Without being bound by theory, it is believed that the block composite, as disclosed herein, acts as an effective compatibilizer for polyolefin elastomers at the elastomer-PP matrix interface in the soft TPO compositions of the present disclosure to yield a fine rubber particle dispersion that provides improved low temperature impact properties. The novel compatibilized blends of PP and elastomers offer a wider range of thermodynamically stable compositions with morphologies finer than those achievable with classical blends, resulting in unique combinations of properties, namely a combination of very high impact resistance at temperatures as low as −45° C., a melt flow rate allowing for easy processing in injection molding, a stiffness level suitable for easy demolding of complex injection molded parts, and improved temperature resistance of the final part.

The polyolefin blend composition may be useful for preparing articles using known processes. For example, the compositions may be fabricated into parts, sheets or other article of manufacture, using any extrusion, calendering, blow molding, compression molding, injection molding, or thermoforming processes. The components of the composition may be fed to the process either pre-mixed, or the components may be fed directly into the process equipment, such as a converting extruder, such that the composition is formed therewithin. The compositions may be blended with another polymer, prior to fabrication of an article. Such blending may occur by any of a variety of conventional techniques, one of which is dry blending of pellets of the compositions with pellets of another polymer.

The polyolefin blend compositions can optionally include one or more additives and/or fillers. Non-limiting examples of additives and/or fillers include plasticizers, thermal stabilizers, light stabilizers (e.g., UV light stabilizers and absorbers), antioxidants, slip agents, process aids, optical brighteners, antistats, lubricants, catalysts, rheology modifiers, biocides, corrosion inhibitors, dehydrators, organic solvents, colorants (e.g., pigments and dyes), surfactants, demolding additives, mineral oil, antiblocking agents, nucleating agents, flame retardants, reinforcing fillers (e.g., glass, fibers, anti-scratch additives, talc, calcium carbonate, mica, glass fibers, whisker, etc.), processing aids, and combinations thereof.

The polyolefin blend compositions may be compounded using, for example, a twin screw extruder, batch mixer, or single screw extruder.

In various embodiments, the present composition comprises a flexural modulus from 300 MPa to 1000 MPa (e.g., from 300 MPa to 800 MPa, from 300 MPa to 500 MPa, from 350 MPa to 450 MPa, etc.), in accordance with ASTM D790 or ISO 178. In certain embodiments, the present composition comprises a flexural modulus of greater than 370 MPa, in accordance with ASTM D790 or ISO 178.

In certain embodiments, the present composition comprises a flexural yield strength from 10 MPa to 50 MPa (e.g., from 10 MPa to 25 MPa, from 10 MPa to 20 MPa, from 10 MPa to 15 MPa, etc.), in accordance with ASTM D790. In certain embodiments, the present composition comprises a flexural yield strength of greater than 10 MPa, in accordance with ASTM D790.

In various embodiments, the present composition comprises a tensile elongation at break from 100% to 150% (e.g., from 100% to 125%, from 100% to 115%, etc.) at room temperature, in accordance with ISO 527. In certain embodiments, the present composition comprises a tensile elongation at break of equal to or greater than 104% at room temperature, in accordance with ISO 527.

In various embodiments, the present composition comprises a tensile yield strength from 10 MPa to 50 MPa (e.g., from 10 MPa to 25 MPa, from 10 MPa to 20 MPa, from 10 MPa to 15 MPa, etc.) at room temperature, in accordance with ISO 527. In certain embodiments, the present composition comprises a tensile yield strength of greater than or equal to 12 MPa at room temperature, in accordance with ISO 527.

In various embodiments, the present composition comprises a tensile elongation at break from 30% to 50% (e.g., from 35% to 40%) at −40° C., in accordance with ISO 527. In certain embodiments, the present composition comprises a tensile elongation at break of equal to or greater than 35% at −40° C., in accordance with ISO 527.

In various embodiments, the present composition comprises a tensile yield strength from 30 MPa to 50 MPa (e.g., from 30 MPa to 40 MPa) at −40° C., in accordance with ISO 527. In certain embodiments, the present composition comprises a tensile yield strength of greater than or equal to 33 MPa at −40° C., in accordance with ISO 527.

In various embodiments, the present composition comprises a notched impact (Izod) from 70 $kJ/m^2$ to 100 $kJ/m^2$ (e.g., from 70 kJ/m² to 90 kJ/m², from 70 kJ/m² to 80 kJ/m², etc.) at −30° C., in accordance with ISO 180. In certain embodiments, the present composition comprises a notched impact (Izod) of greater than or equal to 70 kJ/m² at −30° C., in accordance with ISO 180.

In various embodiments, the present composition comprises a notched impact (Izod) from 50 kJ/m² to 100 kJ/m² (e.g., from 50 kJ/m² to 90 kJ/m², from 50 kJ/m² to 80 kJ/m², etc.) at −45° C., in accordance with ISO 180. In certain embodiments, the present composition comprises a notched impact (Izod) of greater than or equal to 52 kJ/m² at −45° C., in accordance with ISO 180.

In various embodiments, the present composition comprises a notched impact (Charpy) from 70 kJ/m² to 100 kJ/m² (e.g., from 80 kJ/m² to 90 kJ/m²) at −35° C., in accordance with ISO 179-1. In certain embodiments, the present composition comprises a notched impact (Charpy) of greater than or equal to 85 kJ/m² at −35° C., in accordance with ISO 179-1.

In various embodiments, the present composition comprises a notched impact (Charpy) from 50 kJ/m² to 100 kJ/m² (e.g., from 60 kJ/m² to 100 kJ/m², from 70 kJ/m² to 90 kJ/m², etc.) at −40° C., in accordance with ISO 179-1. In certain embodiments, the present composition comprises a notched impact (Charpy) of greater than 70 kJ/m² at −40° C., in accordance with ISO 179-1.

The present composition (or an article made therefrom) may have one, some, or all of the properties discussed above with regard to flexural properties, tensile properties, and impact properties.

EXAMPLES

Approximate conditions, properties, formulations etc., for the preparation of the Examples are provided below.

Test Methods

Density is measured in accordance with ASTM D-792. The result is reported in grams (g) per cubic centimeter, or g/cc.

Melt index (MI) is measured in accordance with ASTM D-1238 (190° C.; 2.16 kg). The result is reported in grams/10 minutes.

Melt flow rate (MFR), as related to Table 4, is measured in accordance with ASTM D-1238 (230° C.; 2.16 kg). Melt flow rate (MFR), as related to Table 5, is measured in accordance with ISO 1133. The results are reported in grams/10 minutes.

Izod Impact, at −30° C. and −45° C., is measured according to ISO 180.

Tensile Properties, including tensile yield strength and tensile elongation at break (at both room temperature and −40° C.), are measured in accordance with ISO 527.

Flexural Modulus, as related to Table 4 (including Flex Young's Modulus and Flex Yield Strength), is measured in accordance with ASTM D790. Flexural Modulus, as related to Table 5, is measured in accordance with ISO 178.

Notched Charpy, at −35° C. and −40° C., is measured in accordance with ISO 179-1.

Differential Scanning calorimetry (DSC) is used to measure crystallinity in the polymers. About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)× 100 (for PE)).

Unless otherwise stated, melting point(s) ($T_m$) of each polymer is determined from the second heat curve (peak Tm), and the crystallization temperature ($T_a$) is determined from the first cooling curve (peak Tc). With respect to DSC, the temperature at the maximum heat flow rate with respect to a linear baseline is used as the melting point. The linear baseline is constructed from the beginning of the melting (above the glass transition temperature) and to the end of the melting point.

High Temperature Liquid Chromatography:

High Temperature Liquid Chromatography Experimental Method Instrumentation is the HTLC experiment, which is done according to the published method with minor modifications (Lee, D.; Miller, M. D.; Meunier, D. M.; Lyons, J. W.; Bonner, J. M.; Pell, R. J.; Shan, C. L. P.; Huang, T. *J. Chromatogr. A* 2011, 1218, 7173). Two Shimadzu (Columbia, Md., USA) LC-20AD pumps are used to deliver decane and trichlorobenzene (TCB) respectively. Each pump is connected to a 10:1 fixed flow splitter (Part #: 620-PO20-HS, Analytical Scientific Instruments Inc., CA, USA). The splitter has a pressure drop of 1500 psi at 0.1 mL/min in $H_2O$ according to the manufacturer. The flow rates of both pumps are set at 0.115 mL/min. After the splitting, the minor flow is 0.01 mL/min for both decane and TCB, determined by weighing the collected solvents for more than 30 min. The volume of the collected eluent is determined by the mass and the densities of the solvents at room temperature. The minor flow is delivered to the HTLC column for separation. The main flow is sent back to the solvent reservoir. A 50-μL mixer (Shimadzu) is connected after the splitters to mix the solvents from Shimadzu pumps. The mixed solvents are then delivered to the injector in the oven of Waters (Milford, Mass., USA) GPCV2000. A Hypercarb™ column (2.1×100 mm, 5 μm particle size) is connected between the injector and a 10-port VICI valve (Houston, Tex., USA). The valve is equipped with two 60-μL sample loops. The valve is used to continuously sample eluent from the first dimension (D1) HTLC column to the second dimension (D2) SEC column. The pump of Waters GPCV2000 and a PLgel Rapid™-M column (10×100 mm, 5 μm particle size) are connected to the VICI valve for D2 size exclusion chromatography (SEC). The symmetric configuration is used for the connections as described in the literature (Brun, Y.; Foster, P. *J. Sep. Sci.* 2010, 33, 3501). A dual-angle light scattering detector (PD2040, Agilent, Santa Clara, Calif., USA) and an IR5 inferred absorbance detector are connected after the SEC column for measurement of concentration, composition, and molecular weight.

Separation for HTLC:

Approximately 30 mg are dissolved in 8-mL decane by gently shaking the vial at 160° C. for 2 hours. The decane contains 400 ppm BHT(2,6-Di-tert-butyl-4-methylphenol) as the radical scavenger. The sample vial is then transferred to the autosampler of GPCV2000 for injection. The temperatures of the autosampler, the injector, both the Hypercarb and the PLgel columns, the 10-port VICI valve, and both the LS and IR5 detectors are maintained at 140° C. throughout the separation.

The initial conditions before injection are as follows. The flow rate for the HTLC column is 0.01 mL/min. The solvent composition in the D1 Hypercarb column is 100% decane. The flow rate for the SEC column is 2.51 mL/min at room temperature. The solvent composition in the D2 PLgel column is 100% TCB. The solvent composition in the D2 SEC column does not change throughout the separation.

A 311-μL aliquot of sample solution is injected into the HTLC column. The injection triggers the gradient described below:

From 0-10 min, 100% decane/0% TCB;

From 10-651 min, TCB is increased linearly from 0% TCB to 80% TCB.

The injection also triggers the collection of the light scattering signal at 15° angle (LS15) and the "measure" and "methyl" signals from IRS detector ($IR_{measure}$ and $IR_{methyl}$) using EZChrom™ chromatography data system (Agilent). The analog signals from detectors are converted to digital signals through a SS420X analog-to-digital converter. The collection frequency is 10 Hz. The injection also triggers the switch of the 10-port VICI valve. The switch of the valve is controlled by the relay signals from the SS420X converter. The valve is switched every 3 min. The chromatograms are collected from 0 to 651 min Each chromatogram consist of 651/3=217 SEC chromatograms.

After the gradient separation, 0.2 mL of TCB and 0.3 mL of decane are used to clean and re-equilibrate the HTLC column for next separation. The flow rate of this step is 0.2 mL/min, delivered by a Shimadzu LC-20 AB pump connected to the mixer.

Data Analysis for HTLC:

The 651 min raw chromatogram is first unfolded to give 217 SEC chromatograms. Each chromatogram is from 0 to 7.53 mL in the unit of 2D elution volume. The integration limit is then set and the SEC chromatograms undergo spike removal, baseline correction, and smoothing. The process is similar to batch analysis of multiple SEC chromatograms in conventional SEC. The sum of all the SEC chromatograms is inspected to ensure both left side (upper integration limit) and right side (lower integration limit) of the peak were at the baseline as zero. Otherwise, the integration limit is adjusted to repeat the process.

Each SEC chromatogram n from 1 to 217 yields an X-Y pair in the HTLC chromatogram, where n is the fraction number:

$$X_n = \text{elution volume (mL)} = D1 \text{ flow rate} \times n \times t_{switch}$$

where $t_{switch} = 3$ min is the switch time of the 10-port VICI valve.

$$Y_n = \text{signal intensity (Voltage)} = \sum_{peak\ start}^{peak\ end} IR_{measure,n}$$

The above equation uses $IR_{measure}$ signal as the example. The obtained HTLC chromatogram shows the concentrations of the separated polymeric components as a function of elution volume. The normalized $IR_{measure}$ HTLC chromatogram is shown in FIG. 9 with Y represented by dW/dV, meaning the normalized weight fractions with respect to the elution volume.

X-Y pairs of data are also obtained from $IR_{methyl}$ and LS15 signals. The ratio of $IR_{methyl}/IR_{measure}$ is used to calculate composition after calibration. The ratio of LS15/$IR_{measure}$ is used to calculate weight-average molecular weight (Mw) after calibration.

Calibration follows the procedures of Lee et al., ibid. High density polyethylene (HDPE), isotactic polypropylene (iPP), and ethylene-propylene copolymer with propylene contents of 20.0, 28.0, 50.0, 86.6, 92.0, and 95.8 wt % P are used as the standards for $IR_{methyl}/IR_{measure}$ calibration. The composition of the standards are determined by NMR. The standards are run by SEC with IR5 detector. The obtained $IR_{methyl}/IR_{measure}$ ratios of the standards are plotted as a function of their compositions, yielding the calibration curve.

The HDPE reference is used for routine LS15 calibration. The $M_w$ of the reference is predetermined by GPC as 104.2 kg/mol with LS and RI (refractive index) detectors. GPC uses NBS 1475 as the standard in GPC. The standard has a certified value of 52.0 kg/mol by NIST. Between 7 to 10 mg of the standard is dissolved in 8-mL decane at 160° C. The solution is injected to the HTLC column in 100% TCB. The polymer is eluted under constant 100% TCB at 0.01 mL/min. Therefore, the peak of the polymer appears at the HTLC column void volume. A calibration constant, Ω, is determined from the total LS15 signals ($A_{LS15}$) and the total $IR_{measure}$ signals ($A_{IR,measure}$):

$$\Omega = \frac{A_{LS15}}{A_{IR,measure} M_w}$$

The experimental LS15/$IR_{measure}$ ratio is then converted to $M_w$ through Ω.

$C^{13}$ Nuclear Magnetic Resonance (NMR) involves the following:

Sample Preparation: samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

Data Acquisition Parameters: data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non-spinning samples in locked mode. Samples are homogenized immediately prior to insertion into the heated (130° C.) NMR Sample changer, and are allowed to thermally equilibrate in the probe for 15 minutes prior to data acquisition. The NMR may be used to determine total weight percent of ethylene, e.g., with respect to the block composite index discussed below.

Molecular Weight Distribution (MWD) is measured via Gel Permeation Chromatography (GPC). A GPC system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.,* 6, 621 (1968)): $M_{polypropylene}=0.645(M_{polystyrene})$.

Xylene Soluble Fractionation Analysis:

A weighed amount of resin is dissolved in 200 ml o-xylene under reflux conditions for 2 hours. The solution is then cooled in a temperature controlled water bath to 25° C. to allow the crystallization of the xylene insoluble (XI) fraction. Once the solution is cooled and the insoluble fraction precipitates from the solution, the separation of the xylene soluble (XS) fraction from the xylene insoluble fraction is done by filtration through a filter paper. The remaining o-xylene solution is evaporated from the filtrate. Both XS and XI fractions are dried in a vacuum oven at 100° C. for 60 min and then weighed.

Microstructure Index Estimation:

In adsorption based solvent gradient interaction chromatography (SGIC) separation of polymer, block copolymer is eluted later than the random copolymer of the same chemical composition (Brun, Y.; Foster, P. *J. Sep. Sci.* 2010, 33, 3501). In particular, the material used for the microstructure index estimation is separated into two fractions, i.e., a random copolymer and a block copolymer of the same chemical composition. The early eluting fraction, i.e., the first fraction, indicates the comparatively higher presence of random copolymers. The late eluting component, i.e., the second fraction, indicates the comparatively higher presence of block copolymers. The microstructure index is defined as:

$$\text{Microstructure Index} = \frac{1}{\sum_{\text{peak start of component 1}}^{\text{peak end of component 2}} w_n \frac{Comp_{n,random}}{Comp_{n,sample}}}$$

where $w_n$ is weight fraction of fraction n. $Comp_{n, random}$ is the chemical composition (wt % P) of fraction n derived from the linear calibration curve. The curve reaches 0 wt % P at 4.56 mL and 100 wt % P at 1.65 mL. The compositions beyond 4.56 mL are considered to be 0 wt % P. The compositions before 1.65 mL are considered to be 100 wt % P. $Comp_{n, sample}$ is the chemical composition (wt % P) of fraction n measured from the sample.

Scanning Electron Microscopy characterization involves the following:

Cryo-microtome for scanning electron microscopy: Specimens were cut out with a razor blade. The isolated pieces were trimmed to an appropriate size by DIATOME trimming knife and polished using a DIATOME CRYO 35° diamond knife at −100° C. on a Leica UC6 microtome equipped with an FC6 cryo-sectioning chamber.

Ruthenium tetraoxide staining: The stain solution was prepared through mixing 0.2 gram of RuCl3.5H2O with 10 milliliter of a 5% v/v NaClO in water. Samples for block staining were glued to the glass slide with double side tape and then put into vial with prepared staining solution. The samples were vapor stained for overnight at ambient temperature. Then the stained samples were rinsed with DI water and then re-polished at −100° C.

Scanning electron microscope: The re-polished block surfaces were put into Nova Nano630 SEM and observed by back scattering electron (BSE) detector at an accelerating voltage of 5 kV, working distance around 6.5 mm and spot size of 5.

CEF:

Comonomer distribution analysis is performed with Crystallization Elution Fractionation (CEF) (PolymerChar, Spain) (Monrabal et al, Macromol. Symp. 257, 71-79 (2007)) equipped with IR-4 detector (PolymerChar, Spain) and two angle light scattering detector Model 2040 (Precision Detectors, currently Agilent Technologies). IR-4 or IR-5 detector is used. A 10 or 20 micron guard column of 50×4.6 mm (PolymerLab, currently Agilent Technologies) is installed just before the IR-4 detector or IR-5 detector in the detector oven. Ortho-dichlorobenzene (ODCB, 99% anhydrous grade) and 2,5-di-tert-butyl-4-methylphenol ("BHT", catalogue number B1378-500G, batch number 098K0686) from Sigma-Aldrich are obtained. ODCB is distilled before use. Silica gel 40 (particle size 0.2~0.5 mm, catalogue number 10181-3) from EMD Chemicals is also obtained. The silica gel is dried in a vacuum oven at 160° C. for about two hours before use. Eight hundred milligrams of BHT and five grams of the silica gel are added to two liters of ODCB. ODCB can be also dried by passing through a column or columns packed with silica gel. For the CEF instrument equipped with an autosampler with N2 purging capability, Silica gel 40 is packed into two 300×7.5 mm GPC size stainless steel columns and the Silica gel 40 columns are installed at the inlet of the pump of the CEF instrument to dry ODCB; and no BHT is added to the mobile phase. This "ODCB containing BHT and silica gel" or ODCB dried with silica gel 40 is now referred to as "ODCB." This ODBC is sparged with dried nitrogen (N2) for one hour before use. Dried nitrogen is such that is obtained by passing nitrogen at <90 psig over $CaCO_3$ and 5 Å molecular sieves. The resulting nitrogen should have a dew point of approximately −73° C. Sample preparation is done with autosampler at 4 mg/ml (unless otherwise specified) under shaking at 160° C. for 2 hours. The injection volume is 300 µl. The temperature profile of CEF is: crystallization at 3° C./min from 110° C. to 30° C., the thermal equilibrium at 30° C. for 5 minutes (including Soluble Fraction Elution Time being set as 2 minutes), elution at 3° C./min from 30° C. to 140° C. The flow rate during crystallization is 0.052 ml/min. The flow rate during cooling step is 0.052 mL/min. The flow rate during elution is 0.50 ml/min. The data is collected at one data point/second. The CEF column is packed with glass beads at 125 µm±6% (MO-SCI Specialty Products) with ⅛ inch stainless tubing according to U.S. Pat. No. 8,372,931. The column outside diameter (OD) is ⅛ inch. The critical parameters needed to duplicate the method include the column internal diameter (ID), and column length (L). The choice of ID and L must be such that when packed with the 125 µm diameter glass beads, the liquid internal volume is 2.1 to 2.3 mL. If L is 152 cm, then ID must be 0.206 cm and the wall thickness must be 0.056 cm. Different values for L and ID can be used, as long as the glass bead diameter is 125 µm and the internal liquid volume is between 2.1 and 2.3 mL. Column temperature calibration is performed by using a mixture of NIST Standard Reference Material Linear polyethylene 1475a (1.0 mg/ml) and Eicosane (2 mg/ml) in ODCB. CEF temperature calibration consists of four steps: (1) Calculating the delay volume defined as the temperature offset between the measured peak elution temperature of Eicosane minus 30.00° C.; (2) Subtracting the temperature offset of the elution temperature from CEF raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that NIST linear polyethylene 1475a has a peak temperature at 101.0° C., and Eicosane has a peak temperature of 30.0° C.; (4) For the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

Block Composite Preparation and Characterization

Block Composite A (BCA) and Block Composite B (BCB) are produced using a catalyst fed simultaneously into two reactors. BCA and BCB each include (i) an ethylene-propylene polymer, (ii) an isotactic propylene polymer, and (iii) a block copolymer including an ethylene-propylene soft block that has a same composition as the ethylene-propylene polymer and an isotactic polypropylene hard block that has the same composition as the isotactic propylene polymer. With respect to each of the block copolymers, the ethylene-propylene soft block is produced in the first reactor and the isotactic polypropylene hard block is produced in the second reactor. The split between the soft block and hard block in the block copolymer of BCA is approximately 50/50. The split between the soft block and hard block in the block copolymer of BCB is approximately 70/30.

BCA and BCB are prepared using two continuous stirred tank reactors (CSTR) connected in series and using a catalyst fed simultaneously into both reactors. The first reactor is approximately 12 gallons in volume while the second reactor is approximately 26 gallons. Each reactor is hydraulically full and set to operate at steady state conditions. Monomers, Solvent, Catalyst, Cocatalyst-1, Cocatalyst-2, and CSA 1 (chain shuttling agent) are flowed to the first reactor according to the process conditions outlined in Table 1. Then, the first reactor contents, as described in Table 1A, below, are flowed to a second reactor in series. Additional Catalyst, Cocatalyst-1, and Cocatalyst-2 are added to the second reactor. Two port injectors are used to fee the Catalyst, Cocatalyst-1, Cocatalyst-2, and CSA 1 separately into the reactors.

The Cocatalyst-1 is a mixture of methyldi($C_{14-18}$alkyl) ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2, which are purchased from Boulder Scientific and used without further purification.

CSA-1 (diethylzinc or DEZ) and Cocatalyst-2 (modified methylalumoxane (MMAO)) are purchased from Akzo Nobel and used without further purification.

The Solvent is a hydrocarbon mixture (ISOPAR® E) obtainable from ExxonMobil Chemical Company and purified through beds of 13-X molecular sieves prior to use.

The process conditions for preparing BCA and BCB are shown in Table 1, below.

TABLE 1

| Material | BCA | | BCB | |
|---|---|---|---|---|
| Reactor | 1st Reactor | 2nd Reactor | 1st Reactor | 2nd Reactor |
| Reactor Control Temp.(° C.) | 105 | 115 | 105 | 115 |
| Solvent Feed (lb/hr) | 335 | 564 | 175 | 285 |
| Propylene Feed (lb/hr) | 28.18 | 73.84 | 21.2 | 24.6 |
| Ethylene Feed (lb/hr) | 51.7 | 0 | 39.7 | 0.8 |
| Hydrogen Feed SCCM) | 67.74 | 0 | 0 | 0 |
| Reactor Ethylene Conc. (g/L) | 4.14 | 1.96 | 0.71 | 1.55 |
| Reactor Propylene Conc. (g/L) | 1.97 | 2.69 | 1.78 | 2.16 |
| Catalyst Efficiency (gPoly/gM) *1.0E6 | 2.68 | 0.23 | 0.73 | 0.24 |
| Catalyst Flow (lb/hr) | 0.29 | 3.26 | 0.41 | 0.54 |
| Catalyst Conc. (ppm) | 99.98 | 99.98 | 200 | 200 |
| Cocatalyst-1 Flow (lb/hr) | 0.27 | 3 | 0.68 | 0.78 |
| Cocatalyst-1 Conc. (ppm) | 1995 | 1995 | 1399 | 1399 |
| Cocatalyst-2 Flow (lb/hr) | 0.34 | 1.86 | 1.47 | 0.39 |
| Cocatatlyst-2 Conc. (ppm) | 995 | 494 | 1494 | 1494 |
| DEZ Flow (lb/hr) | 1.6 | 0 | 1.77 | 0 |
| DEZ Conc. (ppm) | 37503 | 0 | 29987 | 0 |

The resultant BCA is an ethylene-propylene/isotactic polypropylene (E-P/iPP) based block composite that includes 50 wt % of ethylene-propylene (having an ethylene content of 65 wt %) and 50 wt % of isotactic polypropylene (having an ethylene content of 1 wt %).

The resultant BCB is an ethylene-propylene/isotactic polypropylene (EP/iPP) based block composite that includes 70 wt % of ethylene-propylene (having an ethylene content of 65 wt %) and 30 wt % of isotactic polypropylene (having an ethylene content of 3 wt %).

The measured properties of BCA and BCB are provided in Table 2, below.

TABLE 2

| | MFR (g/10 min at 230° C. and 2.1 kg) | Density (g/cm$^3$) | Mw Kg/mol | Mw/Mn | Total C$_2$ (wt %) | Tm (° C.) (second peak) | Tc (° C.) | Tg (° C.) | Melt Enthalpy (J/g) |
|---|---|---|---|---|---|---|---|---|---|
| BCA | 6.5 | 0.879 | 130 | 2.98 | 34.4 | 137 | 96 | −52 | 52 |
| BCB | 5.2 | 0.872 | 101 | 2.45 | 47.2 | 119 | 67 | −49 | 35 |

The Catalyst is ([[rel-2',2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)]dimethyl-hafnium).

Block Composite Index Calculations

The term Block Composite Index (BCI) is herein defined to equal the weight percentage of the block copolymer divided by 100% (i.e., weight fraction). The value of the BCI can range from 0 up to 1.0, where 1.0 would be equal to 100% of the block copolymer and zero would be for material such as a traditional blend or random copolymer. Said in another way, for an insoluble fraction, the BCI is 1.0, and for a soluble fraction, the BCI is assigned a value of zero. The following is a description for estimating the block composite index.

Estimation of Block Composite Index is based on showing that the insoluble fractions contain an appreciable amount of ethylene that would not otherwise be present if the polymer was simply a blend of iPP homopolymer and EP copolymer. To account for this "extra ethylene", a mass balance calculation can be performed to estimate a block composite index from the amount of xylene insoluble and soluble fractions and the weight % ethylene present in each of the fractions.

A summation of the weight % ethylene from each fraction according to equation 1 results in an overall weight % ethylene (in the polymer). This mass balance equation can also be used to quantify the amount of each component in a binary blend or extended to a ternary, or n-component blend.

$$\text{Wt \% } C_{2_{Overall}} = w_{Insoluble}(\text{wt \% } C_{2_{Insoluble}}) + w_{soluble}(\text{wt \% } C_{2_{soluble}}) \quad \text{Eq. 1}$$

$$\text{Wt \% } C_{2_{Overall}} = w_{iPPHard}(\text{wt \% } C_{2_{iPP}}) + w_{EP\ soft}(\text{wt \% } C_{2_{EPsoft}}) \quad \text{Eq. 2}$$

Applying equations 2 through 4, the amount of the soft block (providing the source of the extra ethylene) present in the insoluble fraction is calculated. By substituting the weight % $C_2$ of the insoluble fraction in the left hand side of equation 2, the weight % iPP hard and weight % EP soft can be calculated using equations 3 and 4. Note that the weight % of ethylene in the EP soft is set to be equal to the weight % ethylene in the xylene soluble fraction. The weight % ethylene in the iPP block is set to zero or if otherwise known from its DSC melting point or other composition measurement, the value can be put into its place.

$$w_{iPPhard} = \frac{\text{wt \% } C_{2_{xyleneinsoluble}} - \text{wt \% } C_{2_{EPsoft}}}{\text{wt \% } C_{2_{iPPhard}} - \text{wt \% } C_{2_{EPsoft}}} \quad \text{Eq. 3}$$

$$w_{EPsoft} = 1 - w_{iPPHard} \quad \text{Eq. 4}$$

After accounting for the 'additional' ethylene present in the insoluble fraction, the only way to have an EP copolymer present in the insoluble fraction, the EP polymer chain must be connected to an iPP polymer block (or else it would have been extracted into the xylene soluble fraction). Thus, when the iPP block crystallizes, it prevents the EP block from solubilizing.

To estimate the block composite index, the relative amount of each block must be taken into account. To approximate this, the ratio between the EP soft and iPP hard is used. The ratio of the EP soft polymer and iPP hard polymer can be calculated using Equation 2 from the mass balance of the total ethylene measured in the polymer. Alternatively it could also be estimated from a mass balance of the monomer and comonomer consumption during the polymerization. The weight fraction of iPP hard and weight fraction of EP soft is calculated using Equation 2 and assumes the iPP hard contains no ethylene. The weight % ethylene of the EP soft is the amount of ethylene present in the xylene soluble fraction.

The corresponding BCI calculations for BCA and BCB are provided in Table 3, below.

TABLE 3

| Line # | Variable | Source | BCB | BCA |
|---|---|---|---|---|
| 1 | Overall wt % C2 Total | Measured | 47.2 | 35.5 |
| 2 | wt % C2 in PP block/polymer | Measured | 3 | 0.5 |
| 3 | wt % C2 in EP block/polymer | Measured | 65 | 65 |
| 4 | wt fraction iPP (in block or polymer) | Calc. | 0.287 | 0.457 |
| 5 | wt fraction EP (in block or polymer) | Calc. | 0.713 | 0.543 |
| 6 | Analysis of HTLC Separation | — | | |
| 7 | wt fraction xylene soluble | Measured | 0.589 | 0.281* |
| 8 | wt fraction xylene insoluble | Measured | 0.411 | 0.719* |
| 9 | wt % C2 in xylene insoluble | Measured | 21.7 | 24.0** |
| 10 | wt fraction PP in insoluble | Calc. | 0.699 | 0.636 |
| 11 | wt fraction EP in insoluble fraction | 1-Line 10 | 0.301 | 0.364 |
| 12 | wt fraction Diblock in insoluble fraction | Line 11/Line 5 | 0.423 | 0.671 |
| 13 | Block Composite Index (BCI) | Calc | 0.174 | 0.482 |

*Estimated from CEF
**Estimated mass balance

Blend Compositions

The following materials are principally used in the exemplary compositions of the present application:

PP1: A polypropylene homopolymer having properties including a MFR of 55 grams/10 minutes (ASTM D1238 at 230° C./2.16 kg) (available as H9018 from Lanzhou Petrochemical Company).

PP2: A polypropylene homopolymer having properties including a MFR of 6 grams/10 minutes (ASTM D1238 at 230° C./2.16 kg) (available as 9006 from Sinopec Maoming).

PP3: A polypropylene impact copolymer having typical properties of a MFR of 15 grams/10 minutes (ASTM D1238 at 230° C./2.16 kg) (available as Moplen EP240P from LyondellBasell).

POE1: An ethylene-octene copolymer having a melt index of 1.0 grams/10 minutes (ASTM D1238 at 190° C./2.16 kg) and a density of 0.870 g/cc (ASTM D792) (available as ENGAGE™ 8100 from The Dow Chemical Company).

POE2: An ethylene-octene copolymer having a melt index of 5.0 grams/10 minutes (ASTM D1238 at 190° C./2.16 kg) and a density of 0.870 g/cc (ASTM D792) (available as ENGAGE™ 8200 from The Dow Chemical Company).

POE3: An ethylene-octene copolymer having a melt index of 0.5 grams/10 minutes (ASTM D1238 at 190° C./2.16 kg) and a density of 0.870 g/cc (ASTM D792) (available as ENGAGE™ XLT 8677 from The Dow Chemical Company).

AO1: An antioxidant (available as Irganox 1010 from BASF).

AO2: An antioxidant (available as Irgafos 168 from BASF).

All blends in Table 4 were compounded via twin screw extrusion (using a Coperion 18 mm extruder) and granulated into small pellets by a side cutter granulator. The granulated compounds were then injection molded as samples for testing.

In particular, Working Examples 1 and 2, as well as comparative examples A and B, are prepared according to the following formulations and are analyzed with respect to the following properties:

TABLE 4

| Materials | | Ex. A | Ex. 1 | Ex. B | Ex. 2 |
|---|---|---|---|---|---|
| Formulation (phr) | | | | | |
| PP1 | | 40 | 36 | — | — |
| PP2 | | — | — | 50 | 45 |
| POE1 | | 60 | 54 | — | — |
| POE2 | | — | — | 50 | 45 |
| BCA | | — | 10 | — | 10 |
| AO1 | | 0.1 | 0.1 | 0.1 | 0.1 |
| AO2 | | 0.2 | 0.2 | 0.2 | 0.2 |
| Properties | | | | | |
| MFR | @230° C., 2.16 kg (g/10 min) | 11.17 | 9.14 | 8.65 | 8.29 |
| Flexural | Flex Young's Modulus (MPa) | 398.15 | 373.65 | 412.59 | 407.39 |
|  | Flex Yield Strength (MPa) | 12.04 | 11.56 | 13.91 | 13.86 |
| Tensile (room temperature) | Elongation at break (%) | 115.76 | 104.48 | 80.54 | 113.86 |
|  | Tensile Yield Strength (MPa) | 12.43 | 12.44 | 14.74 | 14.74 |
| Tensile (−40° C.) | Elongation at break (%) | 38.76 | 35.67 | 38.8 | 39.96 |
|  | Yield Strength (MPa) | 29.44 | 33.15 | 37.81 | 39.06 |
| Notched Izod (−30° C.) | Model KJ/m² | 10P 75.93 | 10P 76.82 | 10P 54.66 | 10P 70.72 |
| Notched Izod (−45° C.) | Model KJ/m² | 10P 15.78 | 10P 72.51 | 10P 12.2 | 10P 52.58 |

As seen from Table 4, it is clearly shown that, relative to the comparative examples that are representative of the state of the art, Working Examples 1 and 2 with BCA surprisingly and unexpectedly showed significant improvement in the low temperature (−45° C. and −30° C.) toughness. The flow properties are also very good and other mechanical properties, including flex and tensile modulus, were influenced in a positive way with the addition of BCA.

Furthermore, FIG. 1 presents the SEM for observation of the morphology difference between comparative example B and Working Example 2. As seen in FIG. 1, PP dispersion in the elastomer matrix is much finer with smaller domain sizes and uniform dispersion, which is consistent with the low temperature toughness data indicating that better dispersion can help improve toughness.

As seen below, further examples were prepared and tested. All blends in Table 5 were compounded via Buss Compounder MDK/E 46 with a single mixing screw (46 mm L/D). The granulated compounds were then injection molded as samples for testing.

Specifically, Working Examples 3-6, as well as comparative examples C and D, are prepared according to the following formulations and are analyzed with respect to the following properties:

TABLE 5

| Materials | | Ex. C | Ex. D | Ex. 3 | Ex. 4 | Ex. 5 | Ex. 6 |
|---|---|---|---|---|---|---|---|
| Formulation (wt %) | | | | | | | |
| PP3 | | 64 | 67 | 60 | 60 | 65.8 | 63.4 |
| POE3 | | 36 | 33 | 36 | 36 | 31 | 27 |
| BCA | | — | — | — | 4 | — | — |
| BCB | | — | — | 4 | — | 3.2 | 9.6 |
| Properties | | | | | | | |
| MFR (230° C./ 2.16 kg) | Grams/10 minutes | 7.3 | 7.5 | 7.0 | 7.4 | 7.9 | 8.1 |
| Notched Charpy (@ −35° C.) | kJ/m² | — | 88 | — | — | 89 | 85 |
| Notched Charpy (@ −40° C.) | kJ/m² | 93 | 83 | 90 | 90 | 85 | 74 |
| Flexural Test | MPa | 419 | 416 | 398 | 384 | 408 | 377 |

As seen in Table 5, it is clearly shown that relative to the comparative examples that are representative of the state of the art, the working examples with BCA or BCB surprisingly and unexpectedly maintain the low temperature (−45° C. and −30° C.) toughness at much reduced external rubber levels, especially Working Examples 5 and 6. The flow properties are improved and other mechanical properties, including flex and tensile modulus, are influenced in a positive way with the addition of BCA or BCB.

Figure 2A:
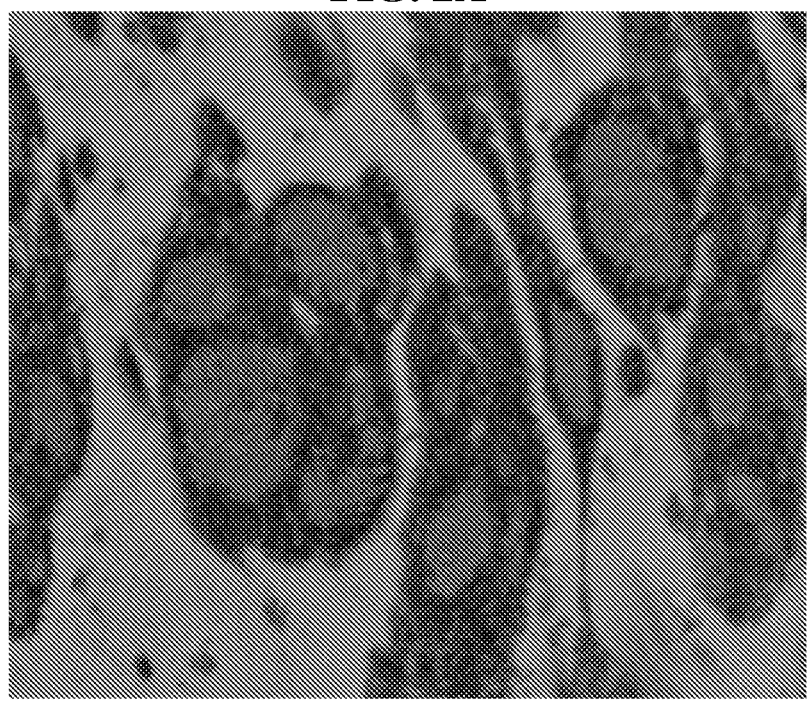
FIGS. 2A-2C illustrates the scanning electron microscope (SEM) morphology characterization, at 500 nm, for a polyolefin elastomer (color phase) dispersed in a PP phase (bright phase) matrix for Comparative Example D, Working Example 5, and Working Example 6.
Figure 2B:
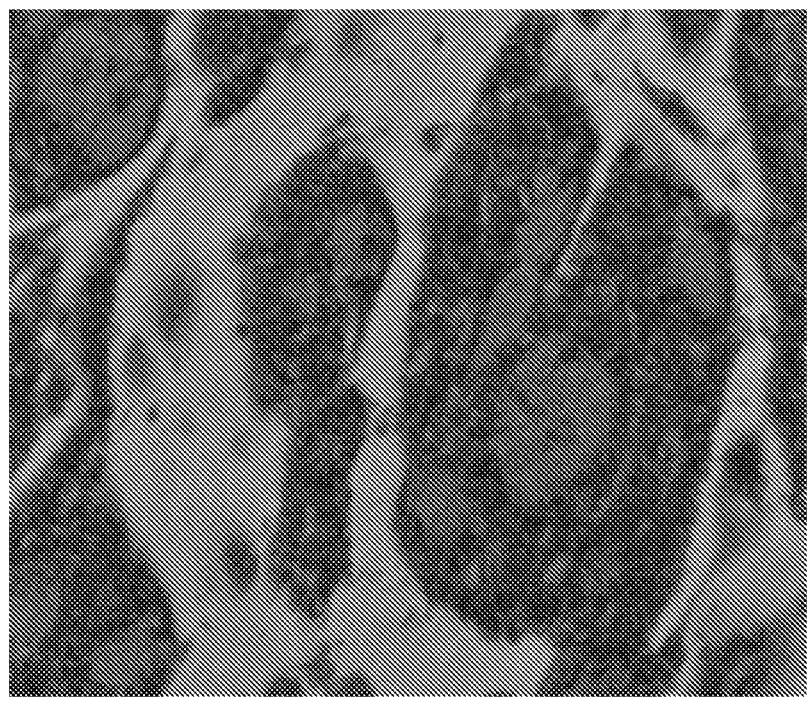
Figure 2C:
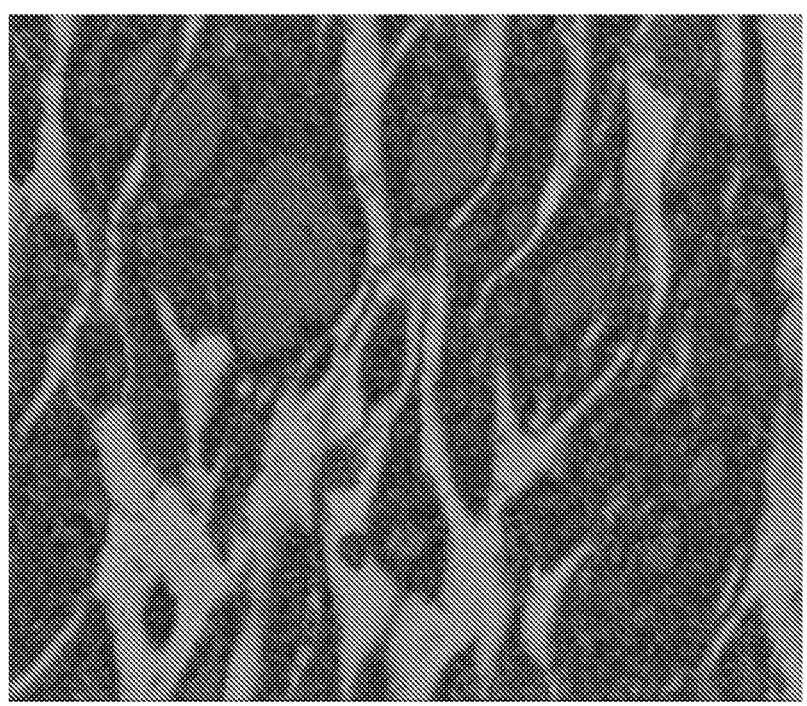

As seen in FIG. 2, the morphology difference between Comparative Example D and Working Examples 5 and 6 is clear. The elastomer dispersion in the PP matrix is much finer with smaller domain sizes and uniform dispersion, which is consistent with the low temperature data that indicates that better dispersion can help improve stiffness/toughness balance.

What is claimed is:

1. A composition comprising:
   (A) from 10 wt % to 90 wt % of a propylene component including at least one propylene based polymer having a propylene content of at least 50.0 wt %, based on the total weight of the propylene based polymer, and a melt flow rate from 0.5 g/10 min to 200.0 g/10 min (ASTM D-1238 at 230° C., 2.16 kg);
   (B) from 1 wt % to 60 wt % of a polyolefin elastomer; and
   (C) from 1 wt % to 20 wt % of a block composite comprising (i) an ethylene-propylene copolymer, (ii) an isotactic polypropylene copolymer, and (iii) a block copolymer including an ethylene-propylene soft block that has a same composition as the ethylene-propylene copolymer of the block composite and an isotactic polypropylene hard block that has a same composition as the isotactic polypropylene copolymer of the block composite,
   wherein the composition further comprises a melt flow rate of greater than or equal to 7.0 g/10 min (ASTM D-1238 at 230°C., 2.16 kg).

2. The composition of claim 1, further comprising (D) from 0.1 wt % to 10 wt % of an antioxidant.

3. The composition of any of the preceding claims, wherein the block composite has a density of from 0.860 to 0.890 g/cc (ASTM D792) and a melt flow rate of from 1 g/10 min to 20 g/10 min (ASTM D-1238 at 230° C., 2.16 kg).

4. The composition of any of the preceding claims, wherein the polyolefin elastomer has a density of from 0.855 to 0.875 g/cc (ASTM D792) and a melt index of from 0.1 g/10 min to 20 g/10 min (ASTM D-1238 at 230° C., 2.16 kg).

5. The composition of any of the preceding claims, further comprising a notched impact of greater than or equal to 70.0 kJ/m$^2$ at −30° C.

6. The composition of any of the preceding claims, further comprising a notched impact of greater than or equal to 85.0 kJ/m$^2$ at −35° C.

7. The composition of any of the preceding claims, further comprising a notched impact of greater than 70.0 kJ/m$^2$ at −40° C.

8. The composition of any of the preceding claims, further comprising a notched impact of greater than or equal to 52.0 kJ/m$^2$ at −45° C.

9. The composition of any of the preceding claims, further comprising:
- a flexural modulus of greater than 370 MPa;
- a flexural yield strength of greater than 10 MPa;
- a tensile yield strength of greater than or equal to 12 MPa at room temperature; and
- a tensile yield strength of greater than or equal to 33 MPa at −40° C.

10. An article made from the composition of any of the preceding claims.

* * * * *